United States Patent [19]

Blau et al.

[11] 4,428,626
[45] Jan. 31, 1984

[54] STABILIZER

[75] Inventors: Harlan E. Blau, Odessa, Tex.; Jimmy D. Elmore, Ardmore, Okla.

[73] Assignee: GH Texas Reamer, Inc., Odessa, Tex.

[21] Appl. No.: 434,060

[22] Filed: Oct. 13, 1982

[51] Int. Cl.³ .............................................. E21B 17/10
[52] U.S. Cl. .................................... 308/4 A; 175/325; 403/318
[58] Field of Search ............... 308/4 A, 4 R; 175/325, 175/413; 166/241; 403/16, 328, 327, 318, DIG. 8

[56] References Cited

U.S. PATENT DOCUMENTS 2,538,757  1/1951  Bratthauer et al. ...... 403/DIG. 8 X
3,454,308  7/1969  Kennedy ..................... 308/4 A
4,106,823  8/1978  Bassinger ..................... 308/4 A
4,190,124  2/1980  Terry ............................ 175/406

Primary Examiner—John M. Jillions
Assistant Examiner—David J. Werner
Attorney, Agent, or Firm—Vinson & Elkins

[57] ABSTRACT

A well wall engaging member such as a reamer or stabilizer in which the wall engaging parts are releasably retained on the body of the device by mating undercut surfaces between the body and the wall engaging member and are released from the body by moving the wall engaging members lengthwise to a non-undercut section of the body and the wall engaging members are held against such lengthwise movement by a retainer pad secured to the body and blocking longitudinal movement of the wall engaging member.

12 Claims, 13 Drawing Figures

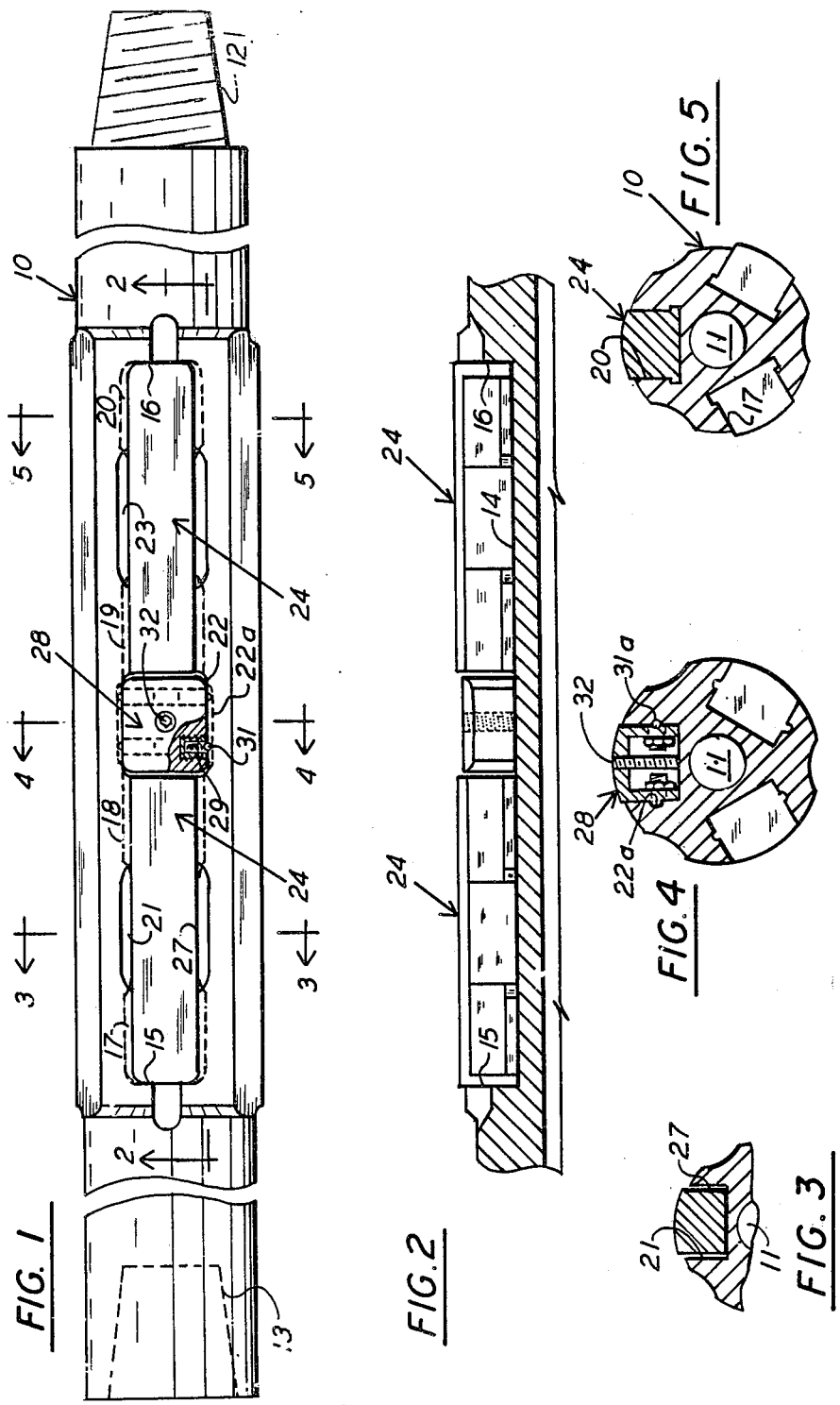

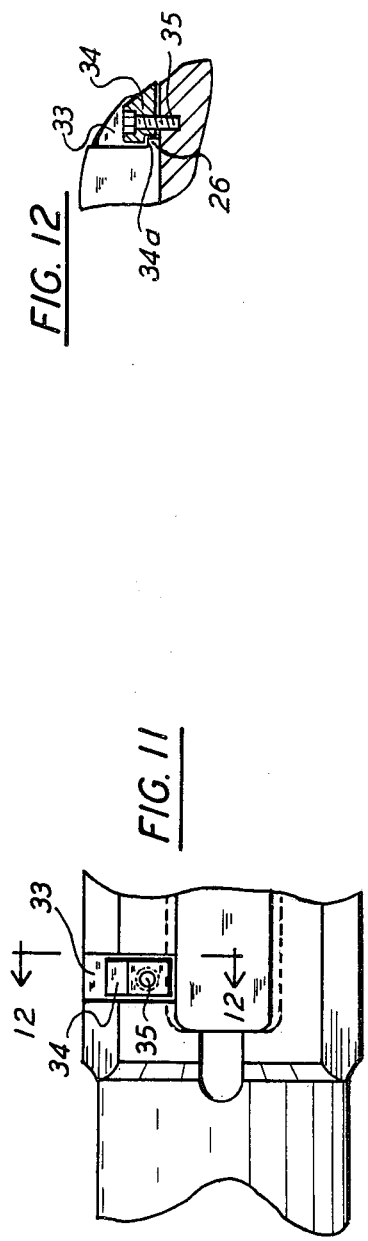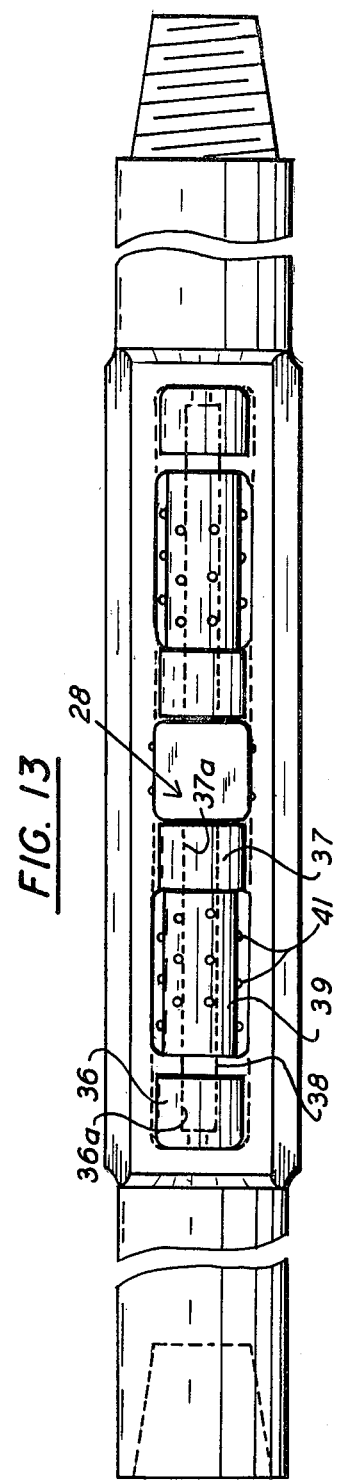

STABILIZER

This invention relates to apparatus to be utilized in drilling operations which engages the wall of the well being drilled such as a reamer or stabilizer.

In the past, drilling equipment such as stabilizers, have been provided with removable wear pads which are held in place by screws. These screws have been utilized to directly secure the wear pads to the stabilizer body. Thus, when a screw becomes loose due to shock or vibration which frequently occurs during use of the tool, the forces induced by dragging the wear pad against the wall of a well are directly transmitted to the screws.

An object of this invention is to provide a wall engaging drilling tool such as a stabilizer or reamer in which the wall engaging parts are removable by disengaging undercut mating sections between the body of the tool and the wear pad and are held against such disengagement by a retainer block secured to the body of the tool.

Another object is to provide a well tool as in the above object in which the retainer pad is held in place by detent means between the retainer pad and the body of the tool.

Other objects, features and advantages of the invention will be apparent from the drawings, the specification and the claims.

In the drawings wherein like reference numerals indicate like parts, and wherein illustrative embodiments of this invention are shown;

FIG. 1 is a view in elevation of a stabilizer constructed in accordance with this invention;

FIG. 2 is a view taken along the lines 2—2 of FIG. 1;

Figure 6:
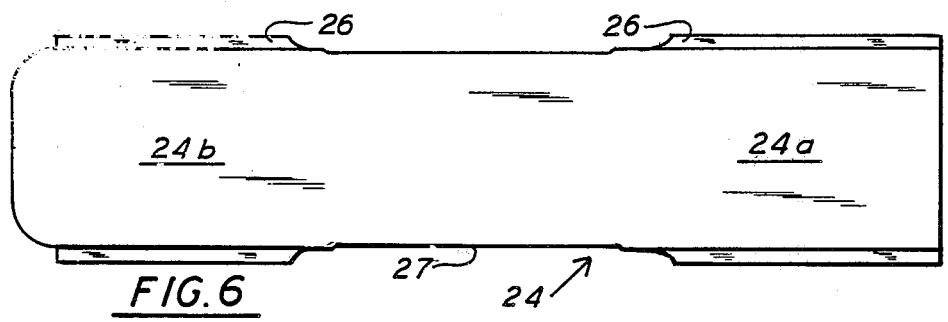
Figure 7:
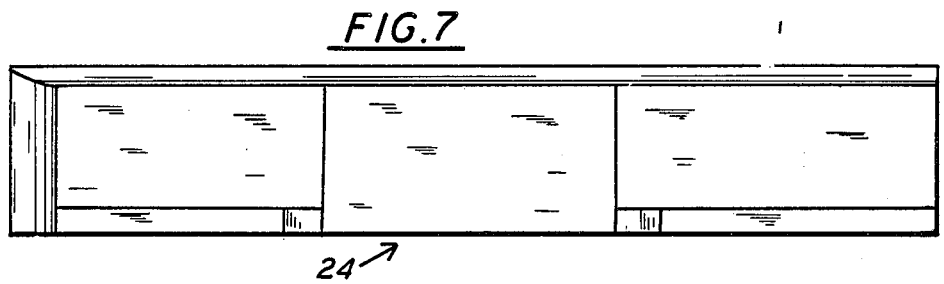
Figure 8:
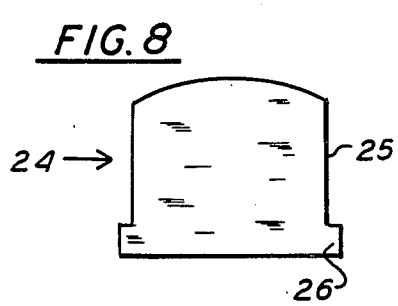
Figure 9:
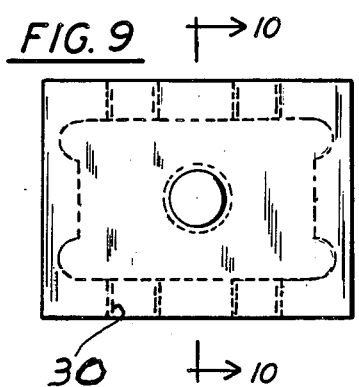
Figure 10:
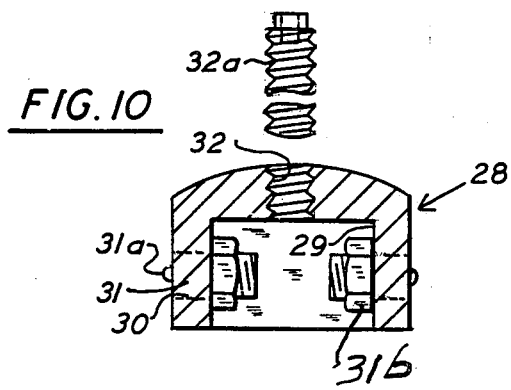

FIGS. 3, 4 and 5 are views taken along the lines 3—3, 4—4 and 5—5 of FIG. 1;

FIG. 6 is a top plan view of a wear pad of FIG. 1;

FIG. 7 is a side view of the wear pad of FIG. 6; FIG. 8 is an end view of the wear pad of FIG. 6;

FIG. 9 is a top plan view of a preferred form of retainer pad;

FIG. 10 is a view along the lines 10—10 of FIG. 9 with a jack screw shown in exploded position;

FIG. 11 is a fragmentary top view illustrating an alternate form of this invention;

FIG. 12 is a fragmentary view taken along the lines 12—12 of FIG. 11; and

FIG. 13 is a top view similar to FIG. 1 illustrating the application of this invention to a reamer.

The stabilizer shown in FIGS. 1 through 10 includes a tubular body indicated generally at 10 having a flowway 11 extending therethrough and a threaded pin 12 at one end and a threaded box indicated in dashed lines at 13 at the other end. The body is designed to be made up as a part of a drill string to stabilize the string in the hole and to conduct drill fluid down to the bit in the conventional manner.

As the stabilizer is in contact with the well bore, it is subject to wear and for this purpose, it is conventional to provide stabilizer blades to contact the well bore which usually contain very hard particles or inserts to prolong the life of the tool. Conventionally, these particles or inserts are tungsten carbide.

To provide for supporting the removable stabilizer blades or wear pads, the body 10 is provided with a plurality of longitudinally extending grooves 14. These grooves may extend coaxially with the body or they may be at slight angles thereto if desired. The grooves are closed at at least one end and are preferably closed at both ends as shown at 15 and 16. To retain the wear pads against radial movement relative to the body 10, the grooves are provided with a plurality of undercut sections such as sections 17, 18, 19 and 20. These sections may be undercut or dovetailed in any desired manner to retain a wear pad therein. Preferably the undercut is provided by a T-shaped groove when viewed in section as shown in FIG. 5 with the vertical leg of the T extending radially and the cross of the T being positioned towards the center of the stabilizer body 10 as best seen in FIG. 5.

To provide for receiving the wear pads which have comparable mirror image T configurations, the groove is provided with at least two non-undercut sections which have width dimensions at least as large as the cross of the T of the undercut section 17. At least two such non-undercut sections are provided with one of the two between a pair of undercut sections. With this arrangement, if one of the undercut sections is placed adjacent the closed end of a slot, a wear pad may be moved radially into the bottom of the groove and then longitudinally into a position where the undercut sections will hold the pad against radial movement.

Thus, where a single wear pad is to be used, the groove is provided with a non-undercut section 21 and 22 with the non-undercut section 21 lying between the undercut sections 17 and 18.

Preferably, two wear pads are positioned in opposite ends of the groove. For this purpose, the undercut sections 17, 18, 19 and 20 will be utilized and an non-undercut section 23 will be provided between the undercut sections 19 and 20 so that by utilizing the non-undercut section 22 with each of non-undercut sections 21 and 23 a pad may be introduced into each end of the groove and held against the ends of the grooves 15 and 16 as will appear hereinafter.

A preferred form of wear pad is indicated generally at 24 and is shown in detail in FIGS. 6, 7 and 8. The wear pad is preferably an elongate member having at opposite ends a T-shaped section 24a and a T-shaped section 24b. The T-shaped section is best shown in FIG. 8 and includes the upright leg of the T 25 having a lesser width dimension than the cross of the T 26. The configuration of the T-shaped sections 24a and 24b will conform to the undercut sections 17, 18, 19 and 20 of the body groove and will be mirror images thereof. As shown in FIG. 5, the wear pad 24 will have a close tolerance with the undercut grooves 17, 18, 19 and 20 so that there will be substantially no play either circumferentially or radially of the wear pad within the body 10.

To cooperate with the non-undercut sections of the body groove such as section 21 which is best shown in FIG. 3, the wear pads are provided with a non-undercut or reduced width release section 27 which has a width dimension less than the width dimension of the undercut sections 18 and 19 of the groove so that the release section 27 of the wear pad may move radially past the side walls of the undercut sections of the body grooves 18 and 19 to be positioned in the bottom of the body groove. With the wear pads 24 in the bottom of the body groove, they may be moved longitudinally into engagement with the groove ends 15 and 16 so that the T-section 26 of the groove will interlock with the corresponding T-sections 17, 18, 19 and 20 of the body groove as shown in FIG. 5 to lock the wear pad against radial movement. As noted above, the tolerances should be close enough at the wear pad is not loose in the body.

It will be appreciated that other forms of dovetail type of configuration could be utilized instead of the T-shaped configuration, if desired.

While each pad is shown to have two T-shaped sections to cooperate with a pair of undercut sections such as 17 and 18, it will be appreciated that as large a number of dovetail sections could be provided as desired with a non-undercut section interposed between each pair of undercut sections in the groove.

To hold one or more wear pads 24 against one or more shoulders in the groove, a retainer block, indicated generally at 28, is provided. If the design utilizes only a single wear pad 24, then the retainer block 28 will hold the wear pad against the end of the groove such as 15 or 16. Preferably, the design provides for at least a pair of wear pads and a single retainer block 28 holds the pair of wear pads in place against the ends 15 and 16 of the body groove. Of course, a larger number than two could be provided and a single retainer 28 may be utilized to hold a multiplicity of wear pads in a groove in a stabilizer body. As shown, it is preferred to use a pair of wear pads 24 held in place by a single retainer block 28.

The retainer block 28 is a simple rectangular structure which is held within a non-undercut section 22 of the body groove. A slight clearance is provided between the retainer block and the wear pads 24 to permit ease of insertion of the retainer block.

The retainer block 28 is preferably hollowed out at 29 to reduce its mass and is held in the body by a plurality of detents.

For this purpose, the side walls of the grooved section 22 are provided with longitudinally extending slots or grooves 22a in each side wall (see FIG. 4).

To cooperate with the grooves 22a, the retainer block 35 is provided with a plurality, preferably four, detents which will engage in the grooves 22a and hold the retainer block in place. As shown best in FIGS. 9 and 10, the block has four transverse threaded bores 30 and a detent carrier 31 indicated in dashed lines is threadedly secured in each bore 30. Each carrier 31 has a spring loaded detent ball 31a for engagement with the groove 22a as shown in FIGS. 1 and 4. The detent carriers are held in place by lock nuts 31b.

To remove the block 27 from the groove 22, a jack screw thread 32 is provided in an axially extending bore in the block 28. Thus, by rotating a screw 32a against the bottom of the groove, the block may be jacked radially outwardly to force the detent balls 31a to retract and permit the retainer block 28 to move radially outwardly of section 22.

From the above it will be seen that by the simple expedient of utilizing the jack screw to jack the retainer block 27 out of the groove section 22 the block may be removed and the two wear pads 24 may be removed from the groove. As shown in the sectional views, it is preferable to utilize wear pads on 120° centers and thus the structures shown in FIGS. 1 and 2 will be repeated at two additional circumferentially located positions on the body. After the blocks are removed, the wear pads may be moved longitudinally to disengage the undercut sections and moved radially out of the body to be replaced by new wear pads. To secure the new wear pads in place it is only necessary to move them radially into the groove with the undercut sections in non-engaging relationship and then move the pads longitudinally of the body until they engage the ends 15 and 16 of the grooves providing room for the retainer block 28 to be introduced between the pair of wear pads to hold them in position with the undercut dovetailed portions of the groove and pads in engagement.

While a detent form of securing the retainer block have been illustrated and is preferred, it will be appreciated that other forms of retainer means may be utilized to retain the block in position.

Referring now to FIGS. 11 and 12, a back-up form of friction lock is illustrated. The friction lock is not necessary and may be utilized as additional security to ensure that the wear pads are not released from a stabilizer body. In the body adjacent each wear pad, a small cavity 33 is cut. The cavity should be at one of the undercut sections of the body so that a portion of the crosshead 26 of the wear pad is exposed. A small retainer block 34, having a downwardly facing shoulder 34a, is secured in the cavity 33 by the stud 35 with the shoulder 34a bearing against the T-shaped section 26 of the wear pad to frictionally lock the wear pad in place.

This invention may be utilized with other forms of wall engaging drilling equipment such as the reamer shown in FIG. 13. The reamer body may be identical to the stabilizer body with the reamer assembly shown in FIG. 13 substituted for the wear pad on either side of the retainer pad. The reamer assembly will include an end bushing 36 and an interior bushing 37. These two bushings will have undercut configurations when viewed in cross-section identical to the undercut portion of the wear pad shown in FIG. 5. The bushing 36 will be provided with a bore shown in dashed lines at 36a and the inner bushing 37 will be provided with a bore shown in dashed lines at 37a. A shaft 38 is mounted within the bushings 36 and 37. Mounted on the shaft for rotation thereabout is the tubular reamer 39 preferably having a plurality of tungsten carbide inserts 41 therein for reaming the hole. The reamer assembly is held in place by the retainer pad 28 hereinabove described. From the above, it will be apparent that this invention may be used with both stabilizers and reamers or any similar type tools.

The foregoing disclosure and description of the invention is illustrative and explanatory thereof and various changes in the size, shape and materials, as well as in the details of the illustrated construction may be made within the scope of the appended claims without departing from the spirit of the invention.

What is claimed is:

1. An apparatus comprising,
   an elongate tubular body having a flowway therethrough and threads on each end for making up in a drill string,
   said body having a plurality of circumferentially arranged elongate slots extending generally longitudinally of the body and closed on at least one end,
   each slot having at least two alternate undercut and two non-undercut sections in the side walls of said slot with one undercut section adjacent the closed end of said slot,
   at least one unitary wall engaging member mounted in said slot and having alternate latch sections on its opposite sides conforming to and confronting said undercut sections to prevent movement of said wall engaging member radially of said body,
   said wall engaging member having a reduced width release section alternating with said alternate latch sections and having a width dimension less than the width of said slot at an undercut section permitting the wall engaging member to move radially of the slot when the reduced width section is aligned with an undercut section, a retainer block, and means releasably securing the retainer block to the body at one of said non-undercut slot sections to position the wall engaging member between a closed end of a slot and the retainer block with the undercut slot section and the latch section of the wall engaging member confronting each other to retain the wall engaging member in the slot, said releasable means permitting movement of the block longitudinally of the body while preventing radial movement of the block relative to the body.

2. The apparatus of claim 1 wherein each slot is closed at both ends and has at least four undercut sections interrupted by three non-undercut sections including a center non-undercut section, and two wall engaging member are positioned against the two closed ends of the slot by a single retainer block positioned in the center non-undercut section.

3. The apparatus of claim 1 wherein the retainer block is held in place by detent means between the body and the retainer block.

4. The apparatus of claim 1 wherein the retainer block is held in place by detent means between the body and the retainer block and a jack screw is provided in the retainer block for jacking the retainer block out of the slot.

5. The apparatus of claim 1 wherein one non-undercut section has longitudinally extending grooves in each side wall and the retainer carries detents cooperable with said slots to releasably secure the retainer block in said section.

6. The apparatus of claim 1 wherein one non-undercut section has longitudinally extending grooves in each side wall and the retainer carries detents cooperable with said slot to releasably secure the retainer block in the central section, and a jack screw is provided in the retainer block for jacking the retainer block out of the slot.

7. The apparatus of claim 1 wherein friction lock means is provided between each wall engaging member and the body.

8. The apparatus of claim 2 wherein the retainer block is held in place by detent means between the body and the retainer block.

9. The apparatus of claim 2 wherein the retainer block is held in place by detent means between the body and the retainer block and a jack screw is provided in the retainer block for jacking the retainer block out of the slot.

10. The apparatus of claim 2 wherein one non-undercut section has longitudinally extending grooves in each side wall and the retainer carries detents cooperable with said slots to releasably secure the retainer block in said section.

11. The apparatus of claim 2 wherein one non-undercut section has longitudinally extending grooves in each side wall and the retainer carries detents cooperable with said slot to releasably secure the retainer block in the central section, and a jack screw is provided in the retainer block for jacking the retainer block out of the slot.

12. The apparatus of claim 2 wherein friction lock means is provided between each wall engaging member and the body.

* * * * *